(No Model.)

W. H. GRAY.
FASTENING FOR CUTTER HEADS.

No. 321,596. Patented July 7, 1885.

Witnesses:
C. E. Sundgren
Emil Herter

Inventor:
William H. Gray
by his Attys
Brown & Hall

UNITED STATES PATENT OFFICE.

WILLIAM H. GRAY, OF BROOKLYN, NEW YORK, ASSIGNOR TO THE GLEN COVE MACHINE COMPANY, (LIMITED,) OF SAME PLACE.

FASTENING FOR CUTTER-HEADS.

SPECIFICATION forming part of Letters Patent No. 321,596, dated July 7, 1885.

Application filed May 11, 1885. (No model.)

*To all whom it may concern:*

Be it known that I, WILLIAM H. GRAY, of Brooklyn, (Greenpoint,) in the county of Kings and State of New York, have invented a new and useful Improvement in Fastenings for Cutter-Heads, &c., of which the following is a specification.

My invention is more especially intended for fastening the cutter-heads of wood-planing machines upon the shafts to which they are secured, and in which it is difficult to insert a set-screw transversely through the cutter-head and against the shaft, because the sides of the cutter-head are so covered by cutters that a set-screw cannot readily be there applied. The invention, however, may be employed in securing upon rotary shafts either heads, hubs, or parts which it is desired to fix upon the shafts so that they may be rotated therewith.

The invention consists in the combination, with a shaft and a head or hub to be secured thereon, of a saddle arranged in said head or hub, movable toward and from the shaft, and having its outer face tapered or inclined, and a screw inserted in the head or hub in a direction lengthwise thereof, and having its inner end taper or conical, and bearing upon the inclined outer face of the saddle, whereby the screw, when turned inward, will act upon the inclined or tapered outer face of the saddle to force it inward against the shaft. The saddle may consist of a plug arranged in a slideway in the head or hub transverse to the shaft.

The invention also consists in constructing the said plug or saddle with a portion of reduced diameter at the inner end, and in forming an inwardly-extending flange or stop at the inner end of the hole or slideway in which the saddle works, and by which the saddle will be prevented from dropping inward out of its slideway in the head or hub when the latter is removed from its shaft.

Figure 1:
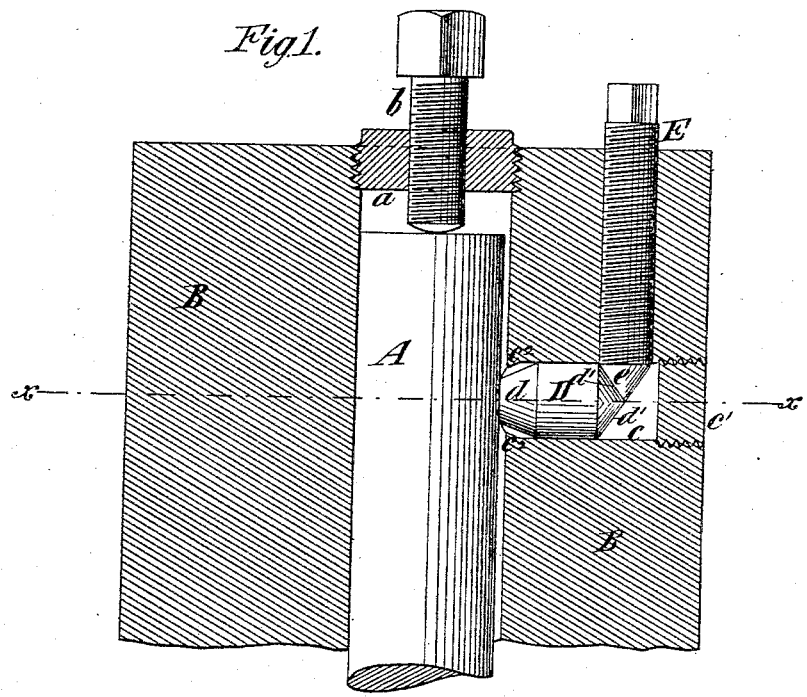
Figure 2:
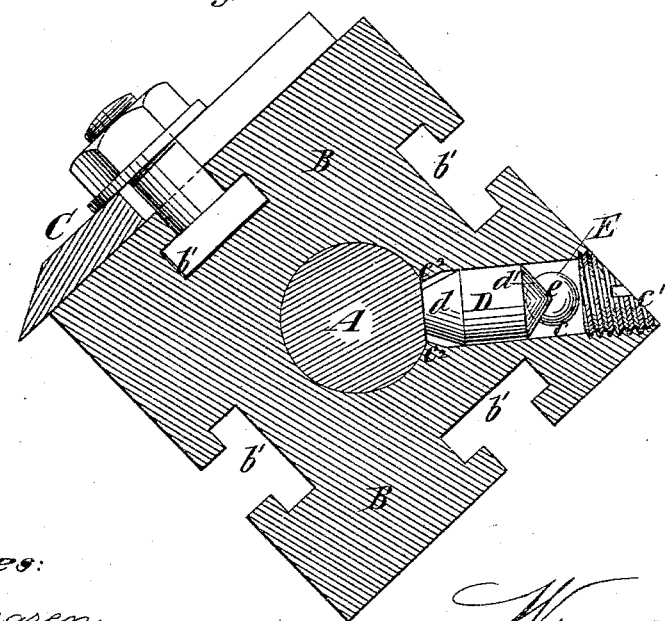

In the accompanying drawings, Figure 1 represents a longitudinal section of a portion of a cutter-head and a portion of a shaft to which it is secured by my improved devices; and Fig. 2 represents a transverse section of a cutter-head and shaft upon the plane of the dotted line $x\ x$, Fig. 1.

Similar letters of reference designate corresponding parts in both figures.

A designates a portion of the cutter-head shaft, and B designates a portion of the cutter-head, which may be of steel or other metal, and which is fitted to and to be secured upon the shaft. As here represented, the outer end of the cutter-head has inserted in its bore a screw-plug, $a$, through which passes a set-screw, $b$, by which the position of the cutter-head on the shaft in a direction lengthwise thereof may be adjusted. To the faces of the cutter-head are secured cutters C, only one of which is shown, and which may be held in place by any suitable devices. As here represented, the faces of the cutter-head are formed with rabbeted longitudinal grooves $b'$, adapted to receive bolts by which the cutters C are secured to it. It will be seen that the cutters C cover so much of the external surface of the cutter-head that it would be difficult to insert a set-screw from the outer side thereof in a direction transverse to its length for securing it to the shaft A.

According to my invention I form in the cutter-head B a slideway or socket, $c$, which extends transversely to the length of the cutter-head and shaft, and in which is fitted a sliding plug or saddle, D. The slideway $c$ and the plug or saddle may be of cylindric form, and after the plug or saddle is inserted into the slideway the outer end thereof may be closed by a plug, $c'$. I have here represented the plug or saddle D as having its inner end, $d$, reduced in diameter, and the slideway $c$ as having at the inner end an inwardly-projecting shoulder or stop, $c^2$. This construction enables the end $d$ of the plug or saddle D to project from the end of the slideway sufficiently to bear against the shaft; but the inwardly-projecting flange or stop $c^2$ prevents the plug or saddle from falling inward out of the slideway before the cutter-head is secured upon its shaft.

E designates an adjusting-screw, which is inserted through the end of the cutter-head in a direction lengthwise of the shaft, and which has its inner end, $e$, conical or taper.

The plug or saddle D has inclined or beveled faces $d'$, against one of which the taper end of the screw E bears, and by turning the screw inward said plug or saddle-piece will be forced against the shaft A by the wedge-like action of the taper end $e$ of the screw on the inclined or beveled faces $d'$ of the plug or saddle.

It will be seen that the power exerted by the screw forcing inward the plug or saddle may be varied by making the inclined faces of the plug or saddle and the taper end of the screw with greater or less inclination.

The inwardly-projecting flange or stop $c^2$, formed at the inner end of the slideway $c$, may be produced by stopping the drill employed in making the hole $c$ before it has come entirely through into the bore of the cutter-head which receives the shaft.

Although only described with reference to securing the cutter-heads of planing-machines upon their shafts, it is evident that my invention may be usefully employed in securing upon a shaft any head or hub which is of such nature or so combined with other parts that a set-screw cannot be readily inserted in a direction transverse to the length of the shaft.

What I claim as my invention, and desire to secure by Letters Patent, is—

1. The combination, with a shaft and a head or hub to be secured thereon, of a saddle in the head or hub movable toward and from the shaft, and having an inclined or beveled outer face, and a screw inserted through the end of the head or hub in a direction lengthwise of the shaft and at an angle to the saddle, and having its inner end conical or tapered to operate with a wedge-like action upon the inclined or beveled outer face of the saddle, substantially as herein described.

2. The combination, with a shaft and a head or hub having in it a slideway or socket extending transversely to the shaft, of a plug or saddle fitting said slideway and having an inclined or beveled outer face, and a screw inserted through the end of the head or hub in a direction lengthwise of the shaft and at an angle to the saddle, and having its inner end conical or tapered to operate with a wedge-like action upon the inclined or beveled outer face of the plug or saddle, substantially as and for the purpose herein described.

3. The combination, with a head or hub, B, having a transverse slideway, $c$, and an inwardly-projecting flange or stop, $c^2$, at the inner end thereof, of the plug or saddle D, having its outer end inclined or beveled, and its inner end of reduced diameter, so as to project through the flange or stop $c^2$, and a screw, E, having its end tapered to operate with a wedge-like action on the inclined or beveled outer end of the plug or saddle, and arranged at an angle thereto, substantially as herein described.

WM. H. GRAY.

Witnesses:
HENRY J. OLDRING, Jr.,
THEO. L. C. HOWE.